Patented Jan. 17, 1950

2,494,544

UNITED STATES PATENT OFFICE 2,494,544
GRAIN PREPARATION

Victor L. Erlich, New York, N. Y., assignor to Wisconsin Malting Company, Milwaukee, Wis., a corporation of Wisconsin No Drawing. Application August 1, 1944,
Serial No. 547,631

4 Claims. (Cl. 99—80)

This invention pertains to the preparation of grain in order to improve its processing for various commercial purposes. The invention involves the preparation of cereal grains and other kernel seeds for instance oilseeds, through determined modifications of the steeping operation normally used.

An object of the invention is to provide certain transformations of the proteins of the respective grains especially as to their solubility before and after further processing of the steeped grains, thus modifying the so-called extract and improving the quality of the extracts or worts in desired directions and thereby improving filtration operations. This also permits the use of various types and varieties of grains excluded or undesirable at present for particular commercial purposes.

Grains may be used for various purposes in commercial processes either directly or for the production of materials rich in starch or in proteins or, in the case of certain cereal grains, for malts. The latter example gives particular evidence of the importance of the various qualities of the grain proteins. The diastatic enzymes developed during germination and remaining in the kilned malt produce hydrolization of the starch in both the malt itself and in the unmalted cereals added to produce fermentable sugars in the brewing and distilling industry. The malting reaction also produces or liberates proteolytic enzymes which degrade and partly solubilize the proteins of the grain again both in the malt and in the added unmalted grains. These two actions are somewhat correlated, since the diastatic enzymes are bound more or less strongly to the proteins of the grain and, therefore, get freed through and with the proteolysis. The proteolysis has importance in the use of the malt in the fermentation processes, as this reaction frees nutrients for the yeast growth in general and in the particular case of beer also influences flavor and froth forming. The partly solublized protein sometimes, however, produces undesirable effects as, for example, a persistent haziness in the wort which cannot be filtered out.

This is one reason why some grains are preferred to others in the brewing industry as, for example some varieties of barley are preferred, and many varieties of wheat especially of high protein hard wheat are unsatisfactory, and rye excluded.

In some cases the proteolysis through germination of the grains may be insufficient to liberate the total potential diastatic enzymes, and this may interfere with the production of malts of high content in active amylase, as is required for distilleries and textile treatment.

In the case of treatment of grains for separate recovery of pure starch and protein enriched products, the corresponding starch is recovered, and the type of protein recovered depends on the type of grain used. For example, wheat or corn give gluten, soy beans yield their special protein, etc. In these cases again the grains are soaked with water previous to separation of the constituent parts through flotation, sedimentation or filtration. During steeping, parts of the proteins which are soluble pass into the steeping water and the quality and behavior of the remaining proteins have a definite influence upon the following operations and the resulting products.

Heretofore the usual commercial practice was to clean the grains and then soak them in such water as was available at an appropriate temperature, when they soaked up the water to possibly 65% of their original weight. The water was preferably what is known as "soft" water.

The present invention involves the controlling of the steeping operation through additions of small amounts of salts especially so as to modify the pH either toward the acid or the alkaline side, depending upon the grain, and the final products desired, and also through a more or less limited proteolysis by enzyme action.

The enzymes used are dissolved or emulsified with the steeping water and the large quantity of steeping water absorbed by the grain and the large increase in volume of the grain during steeping insure intimate contact between the agents introduced into the steeping water and the particles of the swelling grain cells.

The usual steeping schedule is changed somewhat in order to produce the most concentrated introduction of the steeping liquid during the first hours of the operation, and thereby to provide the greatest possible efficiency of the agents for which the steeping liquid is the carrier.

Through variations and combinations of these agents, the transformation of the grain proteins can be influenced over a wide range going from solubilities even lower than normal up to a large increase in solubility by the formation of degraded or peptonized proteinaceous bodies. In the first direction undesirable proteins or compounds will be prevented from solubilization, thus avoiding troubles in filtration or in the wort; but in the latter instance more proteins are prepared for solution and the grain will be better prepared for further proteolytic action as, for instance, through malting.

My process is performed as follows: The grains are cleaned mechanically and as far as possible without using water. If it is necessary to use water in the cleaning operation, this cleaning or rinsing should be performed very rapidly and quite superficially. The grains are then immersed and well mixed with a limited and predetermined quantity of prepared steeping liquid, which is just sufficient to furnish the complete water absorption of the grain with the swollen grain still under water. This steeping liquid is prepared by adding appropriate quantities of pH buffering materials and enzymes and depending upon the grain which is used and the results desired.

For pH buffers on the acid side, I prefer to use acid salts such as primary calcium phosphate, calcium sulphate or organic acids, and on the alkaline side I prefer to use secondary or tertiary sodium phosphate or a sodium carbonate. The choice of the enzyme used depends largely on the commercial availability thereof. At present I prefer to use papain for that reason, but I may use pepsin, trypsinases or yeast autolystes. I have found that all the proteolytic enzymes are useful and the choice of the enzymes used depends to a large extent on commercial availability and cost for the results produced from the particular grain to be treated.

During the steeping operation, I prefer to repeatedly stir the grain and liquid, or to circulate the liquid continuously over the grain. The duration of the steeping operation should be continued to complete absorption and swelling of the steeping liquid by the grain. This may require from a minimum of about eight hours up to possibly twenty-four hours, but not more than thirty-six hours at the usual steeping temperature of approximately 15° to 25° C. The steeping liquid is then drawn off and is followed by a water rinse which is passed through the mass of grain with adequate stirring until complete cleaning of the grain has been attained. The grain material is then in condition for the next steps of processing.

The invention is illustrated by the following examples of comparative runs with different types of grain and in each instance including a representative run employing pure tap water for the steep liquid. In each series of the examples representative samples of the grains were tested before and after treatment by assays performed under closely comparable conditions as to their respective moisture contents, total protein contents (Kjeldahl-nitrogen multiplied by 6.25) and soluble nitrogen in percent of the total. The soluble nitrogen content specified was determined by mashing the crushed or ground sample of grain with seven times its weight of water, digesting at 70° C. over a period of one hour, followed by cooling to about 20° C. and filtering. The soluble nitrogen was then determined in an aliquot part of the filtrate. In some cases, additional determinations of the soluble nitrogen content were made after conversion of the respective grain materials by mixing a given quantity of the grains with a standard barley malt in the proportion of 40 parts of grain materials to 60 parts of malt, then digesting and filtering as above. The procedure outlined also provided for a control of the filtration time and constituted a means of determining the clarity of the wort. The reacted grains were analyzed as indicated either in their wet state or after drying at 100° to 105° C., and in some instances, they were analyzed both wet and dry.

1A 100 lb. of one variety of hard wheat containing 17.2% protein were steeped with pure tap water changed several times over a period of 24 hours; the absorbed moisture resulted in an increase of 51.4% compared with the initial weight. The temperature of the water was 15° C.

1B 100 lb. of the same variety were submitted to preparation according to my procedure and soaked with 15 gallons of steeping liquid, this volume having been determined as being just sufficient to provide for complete absorption by the grain and covering the surface of the swollen material. The steeping liquid had been prepared by emulsifying 0.3 lb. of finely ground fresh papain in 15 gallons of water. The grain was left to soak in this emulsion over a period of 23 hours with repeated stirring. The pH of the liquid resulting to 6.05, the temperature was 15° C. This liquid was then withdrawn and the grain washed with flowing tap water for one hour. The weight increase was determined as being 52.4%.

1C 100 lb. of the same wheat were treated exactly in the same way except that the emulsified papain was reduced to 0.15% of the grain. The resulting pH was 6.15.

1D 100 lb. of the same wheat were treated exactly in the same way as in 1C except that 0.15 lb. of primary calcium phosphate was added to the 15 gallons of emulsion in order to slightly buffer the solution on the acid side. The resulting pH was 5.9.

These four samples were analyzed as to the percentage of proteinaceous compounds soluble in water. The respective assays gave the following figures:

For A_____ 9.05% of the total protein
For B_____ 21.06% of the total protein
For C_____ 17.56% of the total protein
For D_____ 15.15% of the total protein The solubility of the samples treated according to my method was substantially increased, the amount depending on the concentration of added proteolytic enzymes and on the buffering of the steeping liquid.

2A 100 lb. of whole rye grain containing 13.7% total protein on a dry basis were cleaned mechanically and then steeped with pure tap water changed several times over a period of 24 hours; the absorbed moisture resulted in a weight increase of 66% compared with the initial weight of the grains; the temperature of the water was 22° C.

2B 100 lb. of the same variety were mechanically cleaned and then submitted to preparation according to my procedure and soaked with 16.5 gallons of steeping liquid, the latter having been prepared by emulsifying 0.12 lb. of finely ground fresh Ceylon papain. The grain was left to soak in this emulsion over a period of 22 hours with repeated stirring. The pH of the water before emulsion having been 7.6, and 6.9 at the start of the operation resulted finally to 4.85; the temperature was maintained at 22° C. This liquid was then withdrawn and the swollen grain washed with flowing tap water for two hours. The weight increase was determined as 63%.

2C 100 lb. of the same rye were treated exactly in the same way except that the amount of emulsified papain was increased to 0.3 lb. and that 1.3 of sodium bicarbonate was added to the 16.5 gallons of water. The pH resulted at the start to 7.5 and at the end of the 22 hours to 6.4; the weight increase was 69%.

These three samples were dried rapidly in a rotating drum to a moisture content of about 9% and analyzed as to the percentage of proteinaceous compounds soluble in water; they were then submitted to complete inversion of the starch by treating with normal barley malt at a temperature of 70° C. through one hour, and then again analyzed as to solubilized proteinaceous compounds in percentage of the total rye protein. The respective assays gave the following figures:

|  | Before inversion | After inversion |
| --- | --- | --- |
|  | Per cent | Per cent |
| For 2A | 13.05 | 15.7 |
| For 2B | 16.86 | 18.9 |
| For 2 C | 20.97 | 25.8 |

The solubility of the proteinaceous compounds, here again, was increased, the relative amount depending on the concentration of added enzyme and on the buffering of the steeping liquid with salts.

3A 100 lb. of one variety of hard wheat containing 16.0% total protein were steeped according to normal practice in tap water changed several times over a period of 48 hours.

3B

Another 100 lb. of the same sample were soaked in 16 gallons of steeping liquid previously prepared in emulsifying 0.1 lb. of papain and buffered with 0.3 lb. of primary calcium phosphate, the resulting pH in the latter case being 5.3, other conditions as in Example 3A.

The rinsed grain was then dried rapidly in a rotating drum over a period of 20 minutes to a moisture content of 7 to 8%. The dried grains resulting from the two operations were then mixed with normal barley malt of brewery quality in a proportion of 60% malt and 40% dried wheat grains; this mixture was mashed with water and heated slowly up to a temperature of 70° C. and this temperature maintained over a period of 15 minutes in order to reach complete inversion of the starch. The cooled worts were then filtered at 20° C., and the solubilized proteinaceous compounds were determined in the respective worts in percentage of the total proteins.

The wheat steeped in pure water (3A) yielded 14.6%, wort hazy.

The wheat steeped according to my process (3B) yielded 6.2%, wort clear.

Here the solubility of the proteins was reduced after my treatment and this even after following inversion operation.

Similar results were obtained under comparable conditions with the following varieties:

Soft wheat, protein 12.47%, solubility reduced from 25.23% to 13.5
White winter wheat, 11.75%, from 18.1% to 13.8
Red hard wheat 15.36%, from 18.3% to 14.2
Red hard wheat 18.28%, from 15.3% to 12.7
Wort: untreated, hazy; treated, clear.

4A 100 lb. of hard wheat containing 17.2% total protein were steeped in pure cold tap water changed several times according to normal proceeding for the preliminary treatment for the production of malt over a period of 24 hours.

4B 100 lb. of the same sample were submitted to my procedure by soaking in 15 gallons of an emulsion containing 0.3 lb. of papain; the pH was 6.05.

After perfect rinsing the grains were transferred into the germinating equipment at the same time and under the same conditions.

Germination of both samples according to normal malting practice at temperatures going from 15 to 18° C. was terminated in both cases after 4 days. Both samples were dried in the same kiln at normal temperatures beginning with 48° C. and slowly increasing to 65° C. over a period of 2 days, to a moisture content of 5%.

The blank test 4A contained 17.6% total protein, 55.3% soluble.

The treated wheat 4B contained 18.6% total protein, 74.1% soluble.

Here the treatment resulted into a substantial increase of solubility.

5A 100 lb. of one variety of soft wheat containing 9.7% total protein were steeped with pure water and

5B 100 lb. of the same sample were steeped according to my method in an emulsion of 0.3 lb. of papain buffered with 0.6 lb. of secondary sodium phosphate; the resulting pH was 7.7.

Both samples had adsorbed water to a moisture content of 43 and 44% respectively and were submitted to normal germinating procedure under the same conditions as described in Example 4B.

The assays of the two malts which had a moisture content of 8.5 and 7.3% respectively and total proteins of 9.80 and 9.63% showed the following solubilities of proteins:

Blank test 5A _____ 29.8% wort very hazy
Treated sample 5B _____ 59.6% wort very hazy It results that the solubilization in this case was relatively stronger than in Example 4B.

It will be noticed that my novel procedure involves little or no modification of standard apparatus but in some cases adequate stirring or circulating mechanism should be provided for use during the steeping operation, and there is substantially no change in the other apparatus required.

I have described what I believe to be the best embodiments of my invention. I do not wish, however, to be confined to the embodiments shown, but what I desire to cover by Letters Patent is set forth in the appended claims.

I claim:

1. In the steeping of whole non-germinated agricultural grains preparatory to subsequent processing of the same, the controlling of the solubility of the grain proteins by employing a single quantity of steep liquid sufficient to effect substantially full water absorption by the unbroken grains without changing the liquid over the period of time just necessary to obtain substantially full water absorption by the grains, adding proteolytic enzymes in a concentration corresponding to the activity of at least one-twentieth of a per cent of fresh papain, and adding buffering salts to modify the pH of the steep liquid and maintain said pH close to a predetermined level chosen between about 4 and 10 for the particular grain, the particular enzymes and the particular protein transformation.

2. The method of treating whole non-germinated agricultural grains to reduce the solubility of the grain proteins, comprising steeping the unbroken grains in a single quantity of steep liquid sufficient to effect substantially full water absorption by the grains without changing the liquid over the period of time necessary to obtain substantially full water absorption by the grains, adding proteolytic enzymes in a concentration corresponding in activity to not less than about one-twentieth and not more than about one-tenth of a per cent of fresh papain, adding buffering salts to modify the pH of the steep liquid and maintain said pH close to a predetermined level between about 4 and 5.5, washing the steeped grains, and rapidly drying the same.

3. The method of treating whole non-germinated agricultural grains to increase the solubility of the grain proteins, comprising steeping the unbroken grains in a single quantity of steep liquid sufficient to effect substantially full water absorption by the grains without changing the liquid over the period of time necessary to obtain substantially full water absorption by the grains, adding proteolytic enzymes in an amount corresponding in activity to at least one-tenth of one per cent of fresh papain, and adding buffering salts to modify the pH of the steep liquid and maintain said pH close to a predetermined level chosen between about 4 and 10 for the particular grain.

4. The method of treating cereal grains, comprising steeping the whole unbroken grains in accordance with claim 3, washing the steeped grains, and thereafter germinating the grains, thereby producing a malt having a substantially higher percentage of its nitrogenous compounds soluble when compared with malt from the corresponding grains steeped in water not containing the additions specified.

VICTOR L. ERLICH.

REFERENCES CITED

The following references are of record in the file of this patent:

UNITED STATES PATENTS

| Number | Name | Date |
| --- | --- | --- |
| Re. 18,775 | Sherman | Mar. 28, 1933 |
| 99,541 | D'Heureuse | Feb. 8, 1870 |
| 179,700 | D'Heureuse | July 11, 1876 |
| 242,589 | Boon | June 7, 1881 |
| 311,646 | Cuisinier | Feb. 3, 1885 |
| 491,939 | Hansson | Feb. 14, 1893 |
| 855,276 | Blumer | May 28, 1907 |
| 884,725 | Effront | Apr. 14, 1908 |
| 948,514 | Lenders | Feb. 8, 1910 |
| 1,013,497 | Klopfer | Jan. 2, 1912 |
| 1,068,028 | Wahl | July 22, 1913 |
| 1,176,528 | Effront | Mar. 21, 1916 |
| 1,914,244 | Dixon | June 13, 1933 |

OTHER REFERENCES

Enders et al., "About use of hydrogen peroxide in steep water," Wallerstein Communications, 1941, IV, No. 11, page 81.

Prescott and Dunn, Industrial Microbiology (1940), McGraw-Hill Book Co., pages 91 and 92.